United States Patent Office 3,216,959
Patented Nov. 9, 1965

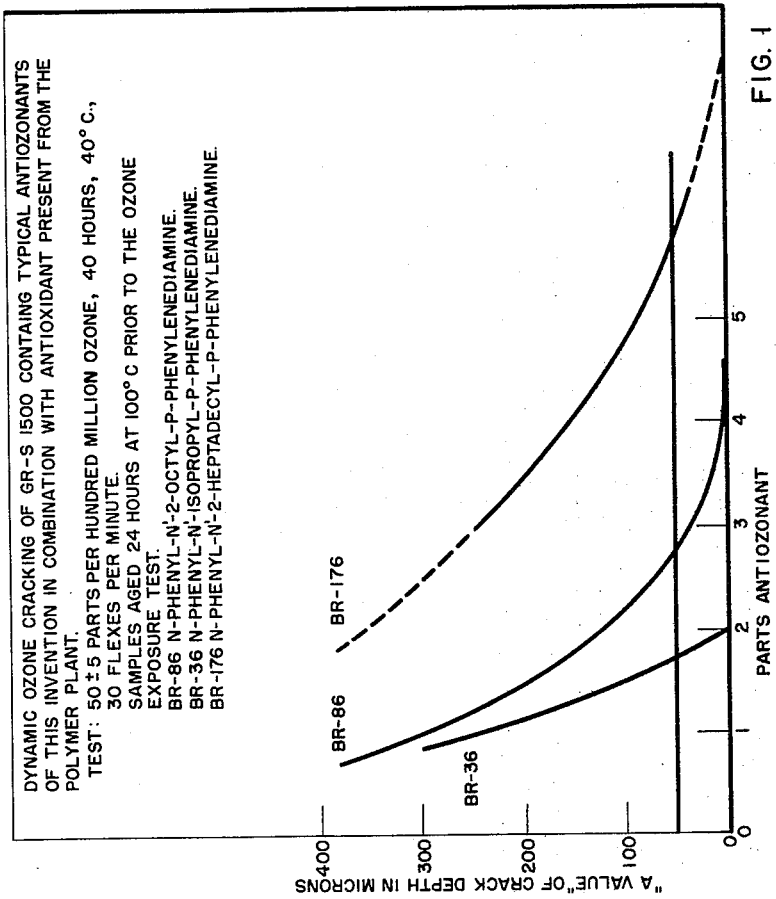

3,216,959
ANTIOZONANT STABILIZATION OF COPOLYMER ELASTOMERS
Eldon E. Stahly, Birmingham, Mich., assignor, by direct and mesne assignments, of three-fourths to Oliver W. Burke, Jr., and one-fourth to Eastman Kodak Company, Rochester, N.Y., a corporation of New Jersey
Original application Aug. 31, 1956, Ser. No. 607,318, now Patent No. 3,163,616, dated Dec. 29, 1964. Divided and this application Jan. 12, 1959, Ser. No. 786,242
The portion of the term of the patent subsequent to Dec. 29, 1981, has been disclaimed and dedicated to the Public
8 Claims. (Cl. 260—28.5)

The present application is a division of copending application Ser. No. 607,318 filed August 31, 1956 now Patent No. 3,163,616 granted December 29, 1964.

This invention relates to the discovery that N-isopropyl-N'-phenyl-p-phenylenediamine (hereinafter sometimes termed "said antiozonant") is useful for inhibiting copolymer elastomers against deterioration by ozone, and to stabilized elastomer compositions containing the same.

It is well known that polymers such as elastomers, particularly those containing residual unsaturation, tend to crack due to attack by ozone, and such crack-formation in elastomer articles progressively increases with time and causes failure in the intended usage of such items, e.g., tires, sealing strips, insulating cables, windshield wipers, gaskets, etc.

It is an object of this invention to provide a new method which is highly effective for retarding and preventing entirely, for extended periods of time, the development of cracks, due to ozone attack, in conjugated diene/vinyl and other conjugated diene/vinylidene elastomer copolymer compositions in static usages, which is characterized by the combination with such copolymer elastomer of a quantity of said antiozonant sufficient to protect the copolymer elastomer from such attack. A further object is to provide synergistic antiozonant compositions based on said antiozonant which display this same effect of stabilizing such copolymer elastomers against ozone attack, with improved antiozonant economy. A still further object is to provide such vulcanized elastomer copolymer compositions stabilized and protected by said antiozonant or said synergistic antiozonant compositions which retain effectiveness during dynamic usages of the copolymer elastomer compositions wherein temperatures of 100° C. and higher are developed.

The term "vinylidene" in a broad sense, includes "vinyl," as is pointed out by British patent to U.S. Rubber Co., No. 639,185, and where used herein and in the claims is to be so construed.

It has now been found that excellent diene/vinylidene elastomer copolymer stabilizing properties, particularly against ozone attack, are possessed by N-isopropyl-N'-phenyl-p-phenylenediamine heretofore disclosed to be useful as a gasoline antioxidant in U.S. Patent 2,734,808.

Prior to this invention it was not predictable that this compound would be an effective antiozonant for such diene/vinylidene copolymer elastomers.

N-phenyl-N'-isopropyl-p-phenylenediamine melts at about 75° C. It may be prepared by reductive alkylation of p-amino-, p-nitroso-, or p-nitrodiphenylamine with hydrogen and dimethyl-ketone, reacted at elevated temperatures (50 to 150° C.) in the presence of catalysts such as platinum, Raney nickel or copper oxide-chromium oxide combinations. It may also be prepared from the p-amino-di-phenylamine and the di-isopropyl sulfate which can be reacted in an aqueous dioxane medium containing sodium hydroxide to provide the N-isopropyl-N'-phenyl-p-phenylenediamine.

The said antiozonant is effective in retarding and inhibiting the cracking of vulcanized copolymer elastomer items resulting from ozone attack. Unprotected copolymer elastomer compositions are quite rapidly deteriorated via ozone attack, GR–S articles for example in high ozone areas such as Los Angeles showing visual cracks in a matter of relatively few hours after being exposed to the atmosphere, whereas identical elastomer compositions into which 1 to 5 pts. of said antiozonant is incorporated do not crack under several years of exposure to the same atmosphere. The present antiozonant compositions are especially valuable for protecting copolymer elastomer articles in dynamic usages wherein temperatures above 100° C. are attained.

This invention further provides synergistic antiozonant compositions comprising mixtures of said antiozonant with certain rubber antioxidants and/or certain thioamide derivatives, with or without waxes including paraffinic and microcrystalline waxes and blends thereof. Thus a mixture comprising from 1 to 9 parts of said antiozonant, 0 to 9 parts of a rubber antioxidant (Table A) and/or a thioamide (Table A), and 0 to 9 parts wax have been found effective for protecting copolymer elastomer compositions against ozone attack. Such antioxidants, thioamides and waxes per se do not protect copolymer elastomers in dynamic usage against ozone attack. In such synergistic combinations however, as little as 0.5 part of said antiozonant per 100 parts of copolymer elastomer composition demonstrate effective antiozone activity in dynamic uses.

TABLE A

*Antioxidants showing synergism with N-isopropyl-N'-phenyl-p-phenylenediamine*

AMINES 6-ethoxy-2,2,4-trimethyl-1,2-dihydroquinoline (Santoflex AW)
2,2,4 - trimethyl-1,2-dihydroquinoline polymer (AgeRite Resin D)
Diphenylamine-acetone condensation products (BLE and Aminox)
Phenyl-beta-naphthylamine (PBNA)
Phenyl-alpha-naphthylamine (PANA or Neozone A)
Aniline-acetone reaction product [1]
Aniline-butyraldehyde reaction product [2]
Di-alpha-naphthylamine
Di-beta-naphthylamine
Phenylenediamine (ortho-, meta, and para-forms)
p,p'-Diaminodiphenylmethane (Tonox)
p-Aminodiphenylamine
1,2-dianilinoethane (diphenylethylenediamine)
o-Tolidine
N,N'-diphenyl-p-phenylenediamine (Perflectol X)
Naphthylenediamine
Di-p-methoxydiphenylamine (Thermoflex)
N,N'-di-sec. butyl-p-phenylenediamine (Tenamene 2)
N,N'-di-beta-naphthyl-p-phenylenediamine (AgeRite Resin White)
N,N'-di-beta-ac-tetrahydronaphthyl-p-phenylenediamine
N,N'-di-alpha-naphthyl-p-phenylenediamine
Tetraethylenepentaminopropionitrile
Mixture of isopropoxydiphenylamine, diphenylphenylenediamine and phenyl-beta-naphthylamine (AgeRite Hipar)

---
[1] For example, AgeRite Resin D (R. T. Vanderbilt Co.) and Flectol H (Monsanto Chemical Co.).
[2] For example, Beutene (Naugatuck Chemical Co.), Antox and Accelerator 808 (Du Pont Chemical Co.), and A–32 (Monsanto Chemical Co.).

Rosinamine D [3]
Dodecylamine
N,N'-tetramethyl-p,p'-di(aminophenyl)methane
N-dimethyl-p-phenylenediamine
The cyanoalkylamines of R. G. Jennen's copending application, Ser. No. 556,432, filed December 30, 1955 [4]

PHENOLIC

Parazone (p-phenylphenol)
Santovar O (2,5-ditert-butyl hydroquinone)
Hydroquinone
Antioxidant 2246 (a p,p'-bisphenol), namely, 2,2'-methylene-bis(6-tert-butyl-p-cresol) produced by American Cyanamide Company.
Santowhite flakes (a dibutyl-phenol sulfide), namely, 4,4'-thio-bis(6-tert-butyl-m-cresol) produced by Monsanto Chemical Company.

PHOSPHITES

Triphenyl phosphite
Tri(nonylphenyl) phosphite (Polygard)

AROMATIC ESTERS

Glycerol monosalicylate ester
Dipropylene glycol monosalicylate ester

THIOMIDES

Thioacetanilide
Thiocarbanilide
Thioacetamide
Dibenzylthiourea
Phenylacetothiomorpholide The amounts of said antiozonant and of the synergistic antiozonant compositions containing said antiozonant which are required to attain effective protection of vulcanized diene/vinylidene copolymer elastomer compounds against ozone attack is dependent to some extent on the type of copolymer elastomer to be protected and its intended usage, but in general will lie within the range of 2 to 5 parts per one hundred of the copolymer elastomer. Where unusually high ozone concentrations are to be met, e.g., in zones where ozone is generated by electric generators, even larger amounts may be employed, even up to 10 pts./100 pts. elastomer. The required concentration is readily determined by prior ozone exposure tests of several preliminarily compounded samples containing varying amounts of said antiozonant or said antiozonant composition under conditions simulating those of the intended usage. Other materials such as dyes, metal deactivators, and the like may be employed in conjunction with said antiozonant and said synergistic antiozonant compositions of this invention.

*Preparation and testing procedures*

The procedures employed in compounding and testing the copolymer elastomer-amino-additive compositions for Tables I, II and III herein was as follows: as control samples "cold" GR-S synthetic rubber (GR-S 1500 polymerized at 41° F. or GR-S 1600 which is the same except that 50 parts HAF carbon black per 100 parts of polymer are incorporated at the polymer plant) or other copolymer elastomer of the conjugated diene/vinylidene type (herein exemplified by butyl rubber, an isobutylene/isoprene copolymer, described in Whitby, "Synthetic Rubber," John Wiley & Sons, N.Y. 1954, page 845) was compounded and vulcanized according to best known commercial practice to obtain good aging properties. Then similar compounds were prepared and vulcanized with said antiozonant and synergistic compositions thereof present as additives. The recipes employed, with Santoflex AW for the control compounds replaced by varying quantities of said antiozonant or synergistic combinations thereof, as indicated in the several tables, were as follows:

Tables I, II

| Components | parts by weight |
|---|---|
| GR-S 1500 [a] | 100 |
| HAF carbon black [a] | 40 to 50 |
| EPC carbon black [a] | 0 to 10 |
| Zinc oxide | 3 |
| Stearic acid | 1 to 3 |
| Phenylbetanaphthylamine (PBNA) | 1 to 1.25 |
| Circo light oil [b] | 2.5 to 3.5 |
| ParaFlux 2016 [b] | 2.5 to 3.5 |
| Sunproof, heliozone, or Atlantic 1115 wax | 0 to 3.0 |
| Santocure (accelerator) [c] | 1.25 |
| Sulfur | 2.0 |
| Additives | As shown |

[a] GR-S 1500 and the carbon blacks were occasionally replaced in these compounds by GR-S 1600 which is identical with GR-S 1500 except that it already contained 50 parts HAF black per 100 parts of the copolymer elastomer. The GR-S copolymer elastomers, as well as the diene copolymers other than GR-S are described in Whitby, "Synthetic Rubber," cited above.
[b] Commercial plasticizing oil (see book entitled "Compounding Ingredients of Rubber," published 1947 by India Rubber World, New York, N.Y.
[c] Santocure is the trade name for N-cyclohexyl-2-benzothiazole sulfenamide.

The recipes for other diene-vinllidene copolymer elastomers tested (Table III) are shown in the following tabulation:

| Elastomer (100 pts.) | Nitrile Rubber Hycar 1014 | Mass [e] BD-S Polymer | Butyl GR-I-17 |
|---|---|---|---|
| Ingredients: [a] | | | |
| Philblack "O" | | 50 | |
| Statex 125 (carbon black) | 40 | | |
| Micronex W-6 (carbon black) | | | 65 |
| Zinc oxide | 3.0 | 3.0 | 5.0 |
| Stearic acid | 1.0 | 1.0 | 3.0 |
| PBNA | | 1.5 | |
| BLE-25 | 1.5 | | |
| AgeRite Resin D | | 1.0 | |
| TP-90B (plasticizer) [b] | 16.0 | | |
| Circo Light Oil | | | 2.0 |
| Atlantic 1115 Wax | 0-1.5 | 0-1.5 | 0-3.0 |
| Altax (Benzothiazyl disulfide) | 1.5 | 1.5 | 0.5 |
| Methyl Tuads [d] | | | 1.0 |
| Sulfur | 1.5 | 1.5 | 2.0 |
| Antiozonant and additives | As shown | | |

[a] Curing ingredients are defined in "Compounding Ingredients for Rubber" 2nd edition, published by India Rubber World, 1947.
[b] A high molecular weight polyether (Thiokol Corp.).
[e] Oil-extended polymer from sodium catalyst polymerization; contains 20 to 25 parts petroleum oil extender.
[d] Tetramethyl thiuram disulfide.

For Butyl rubber the plasticization required for low temperature performance results in nullifying a major portion of the inherent ozone resistance of the polymer itself, and accordingly the antiozonant of the present invention and synergistic combinations thereof are useful in such butyl stocks.

The various copolymer elastomer samples were cured at about 1000 p.s.i. in a steam heated press at 285° F. with curing times adjusted in the range from 30 to 120 minutes, as required to obtain optimum tensile properties for each specific compound. Samples of each of the cured stocks were heat-aged for 24 to 48 hours at 100° C. and were then subjected to ozone exposures in both dynamic and static tests.

The examples in the tables herein are limited to sulfur cured vulcanizates, however, sulfurless curing systems (for example tetramethylthiuramidisulfide; peroxide curing systems such as with dicumyl peroxide; benzoquinone dioxime; radiation curing systems using a radiation source, metal oxide curing of acid elastomer copolymers as for example zinc oxide with butadiene-acrylic acid copolymers and similar curing systems) can effectively be used

[3] (Tradename for technical grade dehydroabietylamine) Condensed Chemical Dictionary, Reinhold Publishing Corporation, New York (1956), page 950.
[4] Corresponding Belgian Patent No. 553,700; corresponding French Patent No. 1,170,742; these cyanoalkylamines are those containing at least one cyano group and at least one amino group and having a total carbon count per molecule of from 2 to 30 carbon atoms, which include the alpha and beta cyanoalkyl-amines, polycyanoalkyl-amines, cyanoalkyl-polyamines, and polycyanoalkyl-polyamines falling within said carbon count range.

with copolymer elastomers containing said antiozonant and said synergistic antiozonant compositions.

The dynamic ozone test was conducted on ½-inch dumbbell specimens of the vulcanizates. The exposure to ozone was carried out in an aluminum-lined ozone cabinet where the concentration of ozone was usually held at 50±5 pphm. of air. This high ozone concentration is used (25±5 pphm. is specified by ASTM Test D–1149–51T) to demonstrate the protective effect of the antiozonants in a reasonably short time of evaluation and to approximate the atmospheric ozone concentrations reported at high altitudes attained by aircraft, and at ground level in the Los Angeles area, to parts of New Mexico and Alaska under certain climatic conditions. Occasionally more highly accelerated ozone exposure tests were conducted by employing ozone concentrations as high as 150 pphm. With such high ozone concentrations much shorter times are required to obtain valid comparisons of the protective action of the additives under test. Each sample was stretched and relaxed continuously at a rate of 30 times per minute, between 0 and 20% elongation on the total sample (0 to 28% on the narrow portion suffering the elongation) to simulate conditions of dynamic use of the copolymer elastomer. After each test, usually of 40 to 70 hours duration, a specimen taken from the center part of the narrow part of the dumbbell was placed under the microscope and the depth of the observed cracks was measured. The depths of the deeper 50% of the observed cracks were averaged, and this average was designated the "A value" and was taken as the index of ozone attack. With each experimental sample a control sample containing Santoflex AW was simultaneously subjected to the same dynamic ozone test, and the average crack depth "A value" was compared with the "A value" for the crack depths of this control sample as a basis of evaluation.

It has been demonstrated that where antiozone protection is obtained in the dynamic tests, protection is also afforded in static us. The static tests run on both heat-aged and unaged samples showed this to be true without exception. (The converse is not always true, e.g., some static protection is afforded by paraffin and microcrystalline waxes, which are valueless for protection of copolymer elastomer articles subjected to dynamic usages.) Specimens for static testing were mounted in accordance with ASTM procedure D518–44, Method B. The mounted samples were placed in the ozone exposure cabinet wherein the ozone concentration was held at a concentration of 50±5 at a temperature of 40° C. In this static test the samples were observed periodically and the time was measured to the appearance of the first crack. Table I shows data for typical static tests performed on examples according to the invention of the present application wherein the tests were terminated after 6 weeks according to current practice of rubber testing laboratories, since such static test data is merely confirmative of data obtained dynamically, further static ozone exposure test data for the antiozonants of the present application are omitted herefrom for the sake of brevity. It suffices to state that long continued tests show that where virtual immunity against ozone was obtained with an antiozonant or a synergistic antiozonant composition in a 40 hour test at 50±5 pphm. of ozone, static protection up to 6 months was obtained at the same ozone concentration (i.e., 50 pphm.) without appearance of ozone cracks. The Santoflex AW controls showed severe cracking in the 40 hour test and failed in about 100 hours or less under the same static test conditions.

Similarly mounted panels of specimens (ASTM procedure D518–44) were also statically tested in outdoor weather experiments in Florida (Miami), California (Los Angeles), and Michigan (Detroit). In California, where highest concentrations of ozone occurred over the time of the test (varied from 5 to 60 pphm. dependent on weather variations) up to six months outdoor exposure were required to develop cracks (ASTM rating 4) in the samples containing antiozonants or synergistic antiozonant compositions. The Santoflex AW controls not only cracked but failed in a month under simultaneous exposure. In the Florida and Michigan tests the protected samples did not crack in a one-year test whereas the control samples not only cracked but failed in the same test. The rating method for the static exposure tests is shown by the following tabulation:

| Rating | Developments in static tests |
|---|---|
| 0 | No development of any kind. |
| 1 | Microscopic cracking. |
| 2 | Fine visible cracking. |
| 3 | Pronounced visible cracking. |
| 4 | Severe visible cracking. |

Synergism

In more detail, the second part of the present invention comprises the discoveries of antiozonant compositions which rely on the action of synergistic antioxidants, paraffin and/or microcrystalline waxes in combination with the N-isopropyl-N'-phenyl-p-phenylene - diamines. When used in more than 3 parts per 100 parts of copolymer elastomer the said derivative of p-phenylene-diamine gives virtual immunity to ozone attack per se. However, in combinations with certain antioxidants it has been found that reduced amounts (e.g., 0.5 to 3.0 parts) of the said N-isopropyl-N'-phenyl-p-phenylenediamine derivative in combinations with 1.25 to 6 pts. total of specific antioxidants serve to protect copolymer elastomers against ozone deterioration, although the antioxidants by themselves do not impart ozone resistance to the copolymer elastomer compounds, nor does less than 1 to 1.5 parts of said antiozonant alone (i.e., in the absence of the specific antioxidants) show adequate protection of the copolymer elastomer compounds. Such admixed and/or interacted components which develop antiozonant activity in protection of copolymer elastomers are termed herein "synergistic compositions."

Thus I have made the discovery that certain antioxidants identified herein (see Table A), themselves incapable of protecting elastomers and plastomers against ozone, have the property of greatly increasing the effectiveness of reduced amounts of said N-isopropyl-N'-phenyl-p-phenylenediamine in copolymer elastomer compositions. Such antioxidants I refer to herein as "synergists."

Still another alternative interpretation of my invention is that a small amount of said antiozonant, which itself can impart ozone resistance to copolymer elastomer compositions incorporating said derivative in certain minimum amounts can develop ozone resistance in antioxidants when admixed therewith in less than such minimum amounts. However, the exact mechanism is immaterial to the practice of the invention which the subsequently discussed data serve to exemplify.

Observed results

Many representative amino compounds, diamino compounds, polyamino compounds and derivatives thereof were tested in GR–S 1500 wherein no adequate protection of vulcanized GR–S synthetic rubber against ozone attack was obtained either before or after the GR–S synthetic rubber vlucanizate was subjected to accelerated aging at elevated temperatures. The results of these tests were listed in Table I of copending joint application, S.N. 523,711, filed July 22, 1955. However, they belong to one or more classes of materials known to have antioxidant properties. Santoflex AW was found to be one of the best of such antioxidants and since usage of said antioxidant was acceptable to tire manufacturers in amount of up to 2 pts./1000 of elastomers, 2 pts. Santoflex AW was used herein as a standard of comparison. Because of the necessity of having separate controls for each group of samples tested, samples containing Santoflex AW were tested with each group of samples containing other amino compounds to monitor the procedure and to give assurance that the several results were valid for evaluating the relative effectiveness of the several amino compounds for protection of GR–S against ozone attack.

Ortho- and meta-diamino aromatic compounds are relatively inactive as antiozonants, also certain compounds, such as phenyl-alpha-naphthyl-amine derivatives, although good antioxidants, are not good antiozonants.

A study of Table I of copending joint U.S. application Ser. No. 523,711, filed July 22, 1955 is sufficient to confirm that most types of amino-antioxidants are of little or no value in compounding synthetic elastomers to make ozone-resistant articles of use. Certain compounds show some protection against ozone nicomparison with Santoflex AW, but after heat-aging protection against ozone is negligible (e.g., di-sec-butyl-p-phenylenediamine). Also certain diamino compounds such as benzidine and 4-aminodiphenylamine protect against ozone, but also act as accelerators resulting in scorchy stocks not acceptable to the industry.

It should also be called to attention that the GR–S 1500 examples of the present invention contained from 1 to 1.25 parts of either phenyl-beta-naphthylamine (PBNA) or a diphenylamine-acetone condensation product (BLE) in addition to the other additives shown, since such antioxidants were added at the polymerization plant.

Tables I, II and III demonstrate the effectiveness of the antiozonant of the present invention and synergistic compositions thereof. It will be noted that all are effective for static as well as dynamic protection against ozone attack.

Table I shows protective action in GR–S resulting from incorporation of the antiozonant of the present invention and certain other antiozonants not herein claimed, and illustrates the great improvement over the control.

Table II shows similar protection afforded to GR–S by the said antiozonant in samples subjected to the dynamic ozone exposure test, and the superiority of said antiozonant to the control and comparative materials; Table III shows the protection afforded other copolymer elastomers by said antiozonant in samples subjected to the dynamic ozone test.

FIGURE 1 shows graphically the change in crack depth in relation to changing concentration for said antiozonant and two comparison antiozonants, and shows the marked superiority of said antiozonant as compared to the other sustituted p-phenylene diamines. Virtual immunity to ozone attack is defined as the range of crack depth "A value" below 50 microns.

TABLE I

*Static ozone test with typical examples of the new class of antiozonants in Elastomers (5 pts./1000 elastomers) 1.5 pts. paraffinic wax added: 50±5 pphm. ozone at 40° C., bent loop test (test terminated at 1008 hrs.)*

| Example | Elastomer | Additive, pts. per hundred elastomer | Unaged, Hrs. at 0 Rating | Aged (24 Hrs. at 100° C.), Hrs. at 0 Rating |
|---|---|---|---|---|
| 1 | GR–S 1500 | Control (2 pts. Santoflex AW) | 5 | 2 |
| 2 | GR–S 1500 | N-phenyl-N'-isopropyl-p-phenylenediamine. | 1,008 | 1,000 |
| 3 | GR–S 1500 | N-phenyl-N'-2-octyl-p-phenylenediamine (for comparison). | 1,008 | 1,000 |
| 4 | GR–S 1500 | N-phenyl-N'-2-heptadecyl-p-phenylenediamine (for comparison). | 1,008 | 1,000 |

TABLE II

*GR–S 1500 containing antiozonants of the present invention dynamic ozone exposure: 40 hrs. @ 50±5 pphm. ozone:40° C.; 30 flexes per minute*

P-PD HEREIN IS USED TO DESIGNATE PARA-PHEYNLENEDIAMINE

| Example | Code | Pts. Additive | Pts. Paraffin Wax | "A Value" Crack Depth (Microns) | |
|---|---|---|---|---|---|
| | | | | Unaged | Aged 24 Hrs. at 100° C. |
| 5 | Control | 2.0 Santoflex AW | 1.5 | 200 | 320 |
| 6 | R–1 | 4.0 N-phenyl-N'-2-octyl-p-PD | 1.5 | 20 | 30 |
| 7 | Q–87 | 4.0 N-phenyl-N'-isopropyl-p-PD. | 0 | 0 | 0 |
| 8 | Q–88 | 4.0 N-phenyl-N'-isopropyl-p-PD. | 1.5 | 0 | 0 |
| 9 | T–11 | 3.0 N-phenyl-N'-isopropyl-p-PD. | 0 | 30 | 0 |
| 10 | T–9 | 2.0 N-phenyl-N'-isopropyl-p-PD. | 0 | 55 | 0 |
| 11 | T–10 | 2.0 N-phenyl-N'-isopropyl-p-PD. | 1.5 | 45 | 35 |
| 12 | T–7 | 1.0 N-phenyl-N'-isopropyl-p-PD. | 0 | 100 | 250 |

TABLE III

*Elastomers other than GR–S 1500, containing anti-Ozonants of the present invention dynamic ozone exposure: 40 hrs. at 50±5 pphm. ozone; 40° C.; 30 flexes per minute*

P-PD HEREIN IS USED TO DESIGNATE PARA-PHENYLENEDIAMINE

| Example | Code | Elastomer | Pts. Additive | Pts. Paraffin Wax | "A Value" Crack Depth (Microns) | |
|---|---|---|---|---|---|---|
| | | | | | Unaged | Aged 24 Hrs. at 100° C. |
| 13 | Control | Butyl Rubber | None | 0 | 100 | 100 |
| 14 | T-63 | do | 5.0 N-phenyl-N'-isopropyl-p-PD | 0 | 20 | ---------- |
| 15 | T-64 | do | 5.0 N-phenyl-N'-isopropyl-p-PD | 1.5 | 20 | ---------- |
| 16 | V-59 | do | 5.0 N-phenyl-N'-isopropyl-p-PD | 0 | 0 | 0 |

GR–S elastomers, both "hot and "cold," sodium polymerized butadiene-styrene mixtures, emulsion polymerized butadiene-methylvinylpyridine copolymer, butadiene-styrene-methacrylic acid copolymers, Butyl and Hycar "N-rubber" are protected against ozone by said antiozonant and said synergistic antiozonant compositions of the present invention.

In addition to the examples given in the tables, copolymers of styrene and butadiene were prepared which contained small amounts of copolymerized carbonyl-containing monomers such as methylvinylketone, crotonaldehyde or methylisopropenyl ketone and compounded, and the results showed that these antiozonants are useful as additives for these carbonyl containing elastomers.

It has further been demonstrated that said antiozonant and said synergistic antiozonant compositions can be compounded with the copolymer elastomers in the Banbury mixer, on the rubber mill, or by incorporation in the copolymer elastomer latices either at the polymer plant or by the consumer at any time prior to or after coagulation and drying to produce copolymer elastomer compounds stabilized against ozone.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

I claim:

1. An elastomer copolymer vulcanizate selected from the class consisting of the butadiene-styrene-, the butadi-methylvinylketone-, the butadiene - styrene-isopropenylene-styrene-methacrylic acid-, the butadiene-styrene-ketone-, the butadiene-styrene-crotonaldehyde, the isoprene-isobutylene-, the butadiene-acrylonitrile-, and the butadienemethyl vinyl pyridene-copolymers, said vulcanizate being inhibited against cracking from ozone attack by the incorporation therein, prior to vulcanization, of an antiozonant composition essentially comprising N-isopropyl-N'-phenyl - p - phenylenediamine, in sufficient amount to retard such cracking.

2. A vulcanizate according to claim 1, in which said antiozonant composition consists substantially entirely of N-isopropyl-N'-phenyl-p-phenylenediamine.

3. A vulcanizate according to claim 1 in which said antiozonant composition consists essentially of said n-isopropyl-N'-phenyl-p-phenylenediamine combined with synergistic material selected from the class consisting of the petroleum waxes and antioxidants and combinations thereof; the petroleum waxes of said class being of the group consisting of the paraffin and microcrystalline waxes and combinations thereof, and the antioxidants of said class being of the group consisting of 7-ethoxy-2,2,4 - trimethyl-1,2-dihydroquinoline; 2,2,4-trimethyl-1,2-dihydroquinoline polymer; diphenylamineacetone condensation products; phenyl-beta-naphthylamine; phenyl-alpha-naphthylamine; aniline-acetone condensation products; aniline-butyraldehyde condensation products; di-alpha-naphthylamine; di-beta-naphthylamine; phenylenediamine, o-, m-, and p- forms; p,p'-diaminodiphenylmethane; p-aminodiphenylamine; 1,2-dianilinoethane; o-tolidine; N, N'-diphenyl-p-phenylenediamine; naphthalenediphenylenediamine; N,N'-di-beta-naphthyl-p-phenylenediamine, N,N'-di-beta-ac-tetrahydronaphthyl-p-phenylenediamine; N,N'-di-alpha-naphthyl-p-phenylenediamine; tetraethylenepentaminopropionitrile; mixture of isopropoxydiphenylamine, diphenylphenylenediamine and phenyl-beta-naphthylamine; dehydroabiethylamine; dodecylamine-1; N,N' - tetramethyl-p,p'-di(aminophenyl)-methane; N,N'-dimethyl-p-phenylenediamine; p-phenylphenol; 2,5-di-tert-butyl hydroquinone; hydroquinone; 2,2i-methlene-bis(6-tert - butyl-p-cresol); 4,4'-thio-bis(6-tert-butyl-m-cresol); triphenyl phosphite; tri(nonylphenyl) phosphite; glycerol monosalicylate ester– dipropylene glycol monosalicylate ester; thioacetanilide; thio-carbanilide; thioacetamide; dibenzylthiourea; phenylacetothiomorpholine and combinations thereof.

4. A vulcanizate according to claim 1, said vulcanizate being a butadiene-styrene copolymer.

5. A vulcanizate according to claim 1, said vulcanizate being a butadiene-styrene-methacrylic acid copolymer.

6. A vulcanizate according to claim 1, said vulcanizate being a butadiene-acrylonitrile copolymer.

7. A vulcanizate according to claim 1, said vulcanizate being an isoprene-isobutylene copolymer.

8. A vulcanizate according to claim 1, said vulcanizate being a butadiene-methylvinylpyridene copolymer.

References Cited by the Examiner

UNITED STATES PATENTS

| 1,916,286 | 7/33 | Reed | 260—45.9 |
| 2,218,661 | 10/40 | Semon | 260—802 |
| 2,734,808 | 2/56 | Biswell. | |
| 2,822,395 | 2/58 | Dent. | |
| 2,905,654 | 9/59 | Ambelang | 260—45.9 |
| 2,941,979 | 6/60 | Pohle et al. | 260—45.9 |
| 3,032,520 | 5/62 | Shaw | 260—45.9 |

FOREIGN PATENTS 23,533    7/35    Australia.

OTHER REFERENCES

Shaw et al.: "Antiozidants for GR–S Rubber," Rubber World, vol. 130, August 1954, pp. 636–642.

MORRIS LIEBMAN, *Primary Examiner.*

HAROLD N. BURSTEIN, ALLAN M. BOETTCHER, ALPHONSO D. SULLIVAN, *Examiners.*

UNITED STATES PATENT OFFICE
CERTIFICATE OF CORRECTION

Patent No. 3,216,959                                  November 9, 1965

Eldon E. Stahly

It is hereby certified that error appears in the above numbered patent requiring correction and that the said Letters Patent should read as corrected below.

Column 3, line 6, for "556,432" read -- 556,423 --; same line 6, after "1955" insert -- now Patent No. 3,038,868, dated June 12, 1962 --; line 24, for "THIOMIDES" read -- THIOAMIDES --; column 4, line 29, for "diene-vinllidene" read -- diene-vinylidene --; column 5, line 39, for "us" read -- use --; column 6, line 75, for "2 pts./1000" read -- 2 pts./100 --; column 7, line 19, for "nicomparison" read -- in comparison --; column 8, in the heading to TABLE I, line 2 thereof, for "5 pts./1000" read -- 5 pts./100 --; same column 8, TABLE II, in the heading, line 2 thereof, for "tion dynamic", in italics, read -- tion-dynamic --, in italics; same TABLE II, third column, line 5 thereof, for "4-0" read -- 4.0 --; columns 9 and 10, TABLE III, in the heading, line 2 thereof, for "invention dynamic", in italics, read -- invention-dynamic --; in italics; column 9, line 19, after "hot" insert a closing quotation mark; lines 55 and 56, for "methylvinylketone-, the butadiene-styrene-isopropenyl-ene-styrene-methacrylic acid-, the butadiene-styrene-" read -- ene-styrene-methacrylic acid-, the butadiene-styrene-methylvinylketone-, the butadiene-sytrene-isopropenyl- --; same column 9, line 59, for "butadienemethyl" read -- butadiene-methyl --; column 10, line 30, for "phenylenediamine;" read -- amine; di-p-methoxydiphenylamine; N,N'-di-sec-butyl-p-phenylenediamine; --; line 34, for "dehydroabiethylamine" read -- dehydroabietylamine --; line 37, for "2,2I-methlene-" read -- 2,2'-methylene- --; same column 10, line 41, for "ester-" read -- ester; --.

Signed and sealed this 15th day of March 1966.

(SEAL)
Attest:

ERNEST W. SWIDER                                EDWARD J. BRENNER
Attesting Officer                                  Commissioner of Patents